United States Patent [19]

Hardy

[11] 4,004,678
[45] Jan. 25, 1977

[54] CONVEYOR SYSTEMS
[75] Inventor: Peter D. Hardy, Welwyn Garden City, England
[73] Assignee: Metal Box Limited, Reading, England
[22] Filed: July 17, 1975
[21] Appl. No.: 596,752
[30] Foreign Application Priority Data
July 19, 1974 United Kingdom ............ 32033/74
[52] U.S. Cl. .............................. 198/460; 198/575
[51] Int. Cl.² ......................................... B65G 47/26
[58] Field of Search .............. 198/34, 76, 110, 139, 198/190

[56] References Cited
UNITED STATES PATENTS

| 2,184,905 | 12/1939 | Brintnall | 198/34 |
|---|---|---|---|
| 3,115,237 | 12/1963 | Atkins | 198/34 |
| 3,133,386 | 5/1964 | Johnston | 198/34 X |
| 3,332,819 | 7/1967 | Siempelkamp | 198/34 X |
| 3,370,693 | 2/1968 | Marsden | 198/34 |
| 3,627,100 | 12/1971 | Bourbina et al. | 198/34 X |
| 3,751,873 | 8/1973 | Toby | 198/34 X |

Primary Examiner—Evon C. Blunk
Assistant Examiner—Richard K. Thomson
Attorney, Agent, or Firm—Diller, Brown, Ramik & Wight

[57] ABSTRACT

A conveyor handling system for transporting articles from a first position to a second position is described. The system includes first and second conveyors extending in series between the two positions and arranged to convey articles at two respectively different speeds. A sensor is responsive to the approach of an article to the junction between the two conveyors at which the article is transferred from one conveyor to the other to displace the junction, without altering the speeds of the two conveyors, in a sense to accelerate the transfer of the articles between the two conveyors.

8 Claims, 4 Drawing Figures

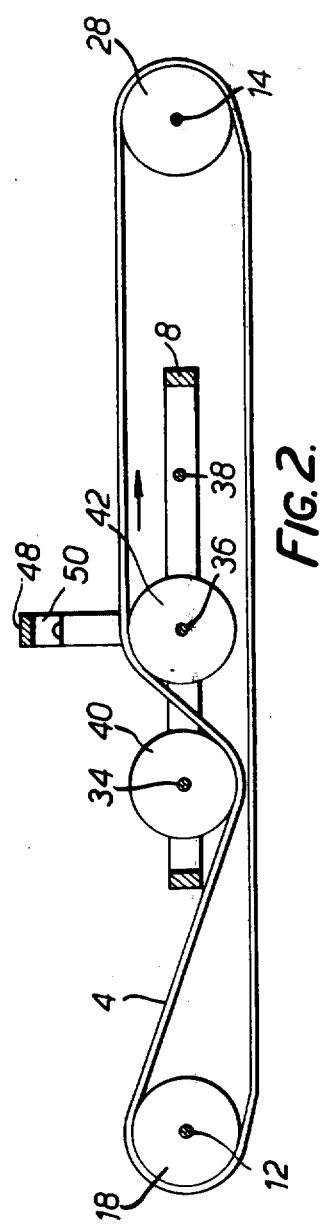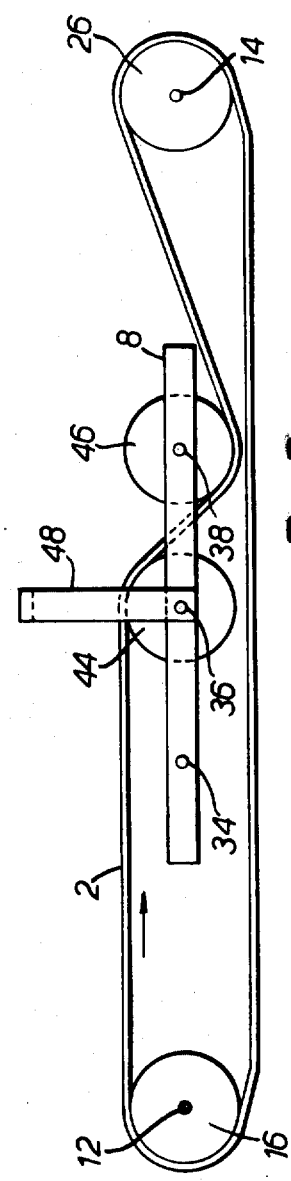
FIG.2.
FIG.3.

CONVEYOR SYSTEMS

BACKGROUND OF THE INVENTION

1. Field of the Invention

The invention relates to conveyor systems for handling articles.

2. Description of the Prior Art

Conveyor systems are known where articles carried by one conveyor moving at one speed are transferred to another conveyor moving at a different speed. In such systems, difficulties often occur at the point of transfer. For example, if the leading edge of the article is not perpendicular to the direction of motion of the article, the article will undergo a change in the angle it makes with the direction of motion as it passes over the transfer point. Furthermore if the article in question consists of a shingled stack of laminar members, the members will be displaced relative to one another as the stack passes over the point of transfer.

It is an object of the invention to provide an improved conveyor system.

It is a more specific object of the invention to increase the speed at which the transfer from one conveyor to another takes place and thereby reduce the above adverse effects.

SUMMARY OF THE INVENTION

According to the invention there is provided a conveyor handling system for transporting articles from a first position to a second position, comprising means providing first and second conveyors extending in series between the two positions and arranged to convey articles at two respectively different speeds, and means responsive to the approach of an article to the junction between the two conveyors at which the article is transferred from one conveyor to the other, to displace the junction without altering the speeds of the two conveyor means in a sense to accelerate the transfer of the articles between the two conveyors.

According to the invention there is further provided a conveyor handling system for transporting articles from a first position to a second position, comprising two endless belts extending between the first and second positions and arranged to be driven at different speeds in the same sense, a carriage movable between the first and second positions and constraining intermediate portions of said endless belts so that one belt forms the upper run of the conveyor system to one side of a datum position on the carriage and the other belt forms the upper run of the conveyor system on the other side of the datum position, whereby movement of the carriage will vary the lengths of the belts which define the upper run, sensing means movable with the carriage for sensing when an article on the upper run of the conveyor reaches the datum point, and control means responsive to the sensing means to displace the carriage in a sense to accelerate the transfer of the article from one belt to the other.

BRIEF DESCRIPTION OF THE DRAWINGS

Conveyor systems embodying the invention will now be described, by way of example, with reference to the accompanying drawings in which:

FIG. 2 is a view taken on the line II—II of FIG. 1;

FIG. 3 is a view taken on the line III—III of FIG. 1; and

DESCRIPTION OF THE PREFERRED EMBODIMENTS

Packaging machines for packaging sliced bacon are normally arranged to receive stacks or groups of shingled bacon slices at regular intervals. If the stacks of bacon slices are delivered to the packaging machines on a conveyor belt this means that adjacent stacks of bacon slices on the belt must be spaced apart by a fixed distance. The system to be described with reference to FIGS. 1 to 3 is designed to serially receive stacks of shingled bacon slices with random serial spacing or even no serial spacing between them and to establish automatically a predetermined minimum spacing.

Figure 1:
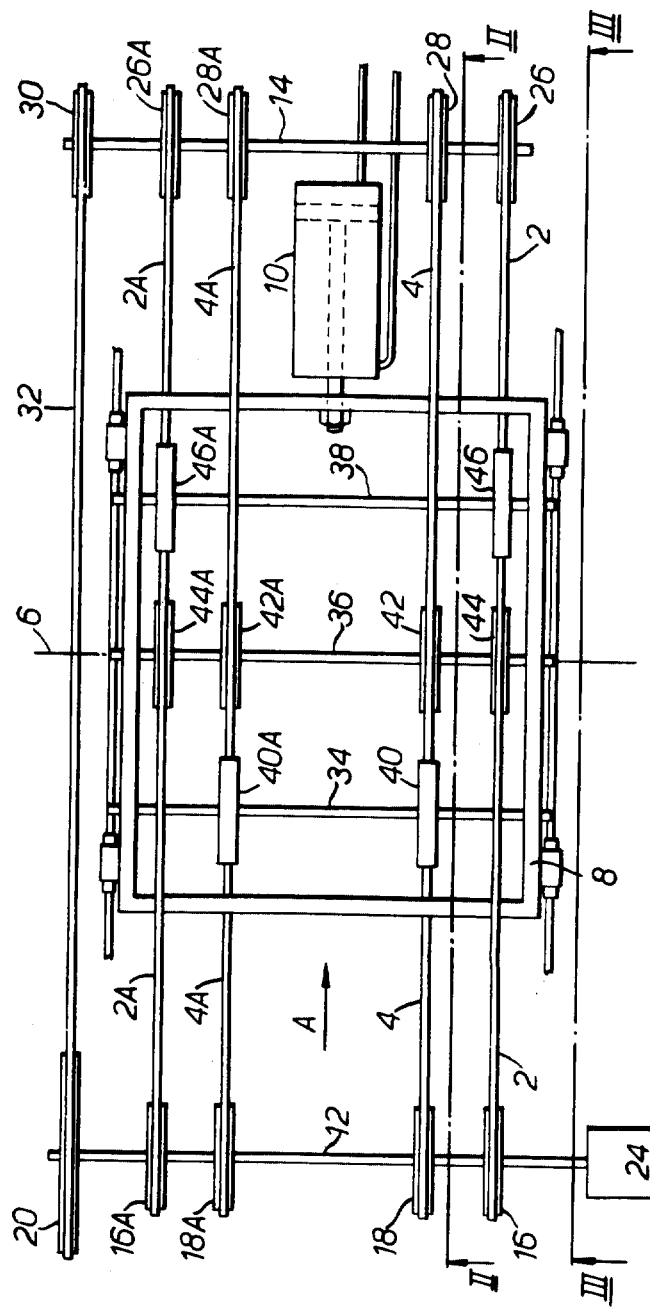
FIG. 1 is a fragmentary plan view of one of the conveyor systems.
Figure 4:
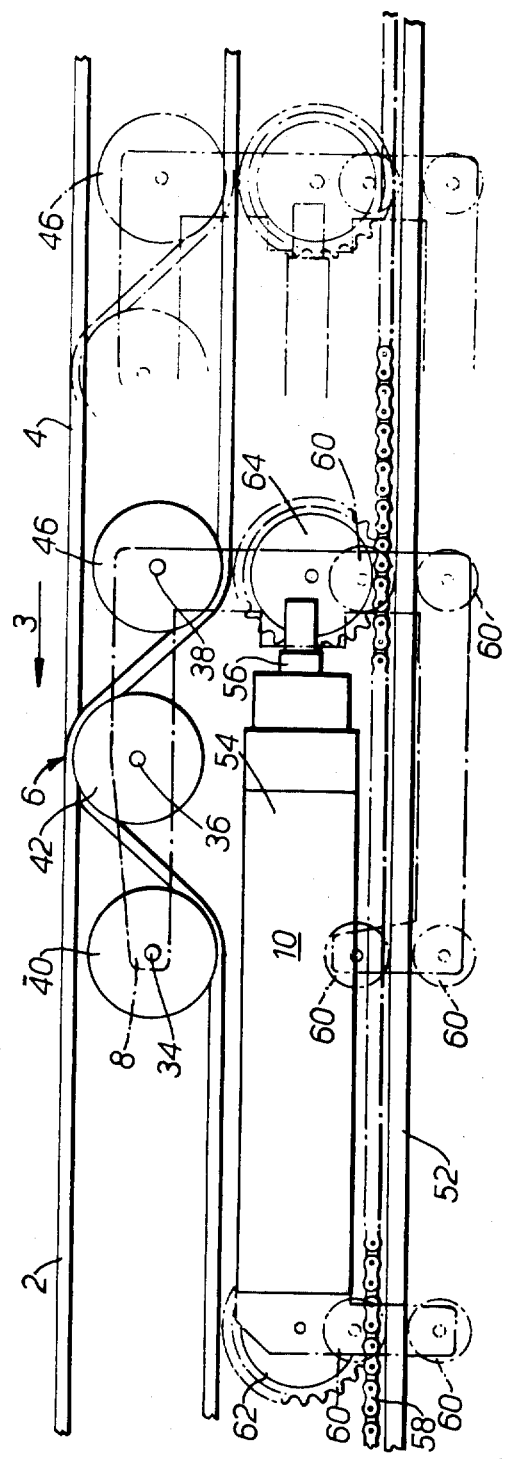
FIG. 4 is a fragmentary side elevation of another of the conveyor systems.

The modified conveyor system shown in FIG. 4 is arranged to receive stacks of bacon slices having a random but minimum serial spacing between stacks, such as would be delivered from the conveyor system of FIGS. 1 to 3, and to automatically space them apart by a constant predetermined distance.

As shown in FIG. 1, the forward direction of the conveyor system is indicated by arrow A. The system includes two pairs of endless belts 2 and 2A and 4 and 4A. The two belts 2 and 2A provide the upstream portion of the upper run of the conveyor, while the two belts 4 and 4A provide the downstream portion of the upper run of the conveyor. The belts 4 and 4A are arranged to be driven advantageously at three times the speed of the belts 2 and 2A so that at the junction 6 between the upstream and downstream portions of the upper run of the conveyor an abrupt change in speed occurs. The belts 2, 2A, 4 and 4A at this junction 6 extend around pulleys (which will be described in more detail hereinafter) carried by a movable carriage 8. The carriage 8 is arranged to be reciprocated in a direction parallel to the upper run of the conveyor by a piston and cylinder arrangement 10 and this in turn enables the junction 6 to reciprocate.

Two rotary shafts 12 and 14 lying at opposite ends of the conveyor each carry five pulleys.

Of the five pulleys carried by the shaft 12, three pulleys 16, 16A and 20 are rigid with the shaft while two pulleys 18 and 18A are rotatable relative to the shaft. Of the five pulleys carried by the shaft 14, three pulleys 28, 28A and 30 are rigid with the shaft while two pulleys 26 and 26A are rotatable relative to the shaft. The shaft 12 is rotated by a motor 24. An endless belt 32 which couples the pulleys 20 and 30 enables the rotation of the shaft 12 to be transmitted to the shaft 14. The relative diameters of the pulleys 20 and 30 are such that when the shaft 12 is rotated, it causes the shaft 14 to be rotated at three times the speed.

The carriage 8, which is located between the shafts 12 and 14, is arranged to run on rails (not shown) extending between shafts 12 and 14.

The carriage 8 carries three spaced shafts 34, 36 and 38 each of which is parallel to and lies in the same common plane containing the shafts 12 and 14. The shaft 34 carries independently rotatable pulleys 40 and 40A, the shaft 36 carries independently rotatable pulleys 42, 42A, 44 and 44A and the shaft 38 carries independently rotatable pulleys 46 and 46A.

The pulleys 16, 44, 46 and 26 all lie in the same plane and are linked by the endless belt 2 in the manner indicated in FIG. 3.

The pulleys 16A, 44A, 46A and 26A all lie in the same plane and are linked by the endless belt 2A in a manner similar to that indicated in FIG. 3.

The pulleys 18, 40, 42 and 28 all lie in the same plane and are linked by the endless belt 4 in the manner indicated in FIG. 2.

The pulleys 18A, 40A, 42A and 28A all lie in the same plane and are linked by the endless belt 4A in a manner similar to that indicated in FIG. 2.

The carriage 8 has an inverted U-shaped bracket 48 (not shown in FIG. 1) which carries a photo cell (see FIG. 2).

In operation, shingled stacks of bacon slices are deposited in succession on the conveyor at the upstream end (as by hand or from another conveyor not shown) and are carried from left to right as viewed in FIG. 1 by the two belts 2 and 2A. The stacks have random or even no serial spacing between them. As each group approaches the change of speed line 6, its leading edge is detected by the photo cell 50 mounted on the carriage 8. When it detects the leading edge of a stack, the photocell generates an output signal which is used to trigger the piston and cylinder arrangement 10 and so drive the carriage rapidly upstream of the conveyor by a predetermined distance. The distance that the conveyor is displaced is preset to correspond with the average dimension of each stack of bacon slices taken in the direction of movement of the conveyor. As a result of this movement of the carriage, the junction 6 is displaced rapidly underneath the stack of bacon slices to cause a rapid transfer of the group from the belts 2 and 2A to the belts 4 and 4A.

Upon completion of the transfer, the transferred group of bacon slices will now travel at three times the speed of the next following stack of bacon slices on the upstream portion of the conveyor because the transferred stack is now being carried by the faster moving belts 4 and 4A.

At this point, the piston and cylinder 10 will automatically be actuated to perform a return stroke which will return the carriage to its initial position at a speed not less than that of the belts 2 and 2A but not greater than the speed of the belts 4 and 4A.

After the carriage has returned to its initial position, the leading edge of the next following stack of bacon slices will be detected by the photo cell and the cycle will be repeated.

It will be appreciated that if two stacks of bacon slices are placed on the upstream portion of the conveyor in abutting relationship, then the separation of the groups after both have been transferred to the downstream portion will be equal to twice the stroke of the piston and cylinder arrangement 10. It will also be appreciated that the provision of the carriage in effecting a very rapid transfer of each group of bacon slices from the slow to the fast belts of the conveyor prevents any substantial increase in skew of a stack of bacon slices, which would otherwise occur if a group of bacon slices arrived askew at the junction 6 and the junction 6 were to be maintained stationary. In addition the possibility of causing skew, and separating slices in the group, where the group of bacon slices are irregular in shape can also be reduced.

The conveyor system of FIG. 4 is similar in construction to that of FIGS. 1 to 3 except that the cylinder of the piston and cylinder arrangement 10 is mounted on a drive chain assembly for movement in a direction parallel with the upper run of the conveyor. Parts in FIG. 4 similar to those in FIGS. 1 to 3 are similarly referenced.

As shown in FIG. 4, the carriage 8 is mounted by means of wheels 60 on a pair of rails 52 (only one shown) lying below the lower run of the conveyor system. The piston 56 of the piston and cylinder arrangement is rigidly secured to the carriage 8 and an endless link chain 58 extends along the centre line of the conveyor between the rails 52, its return run (not shown) passing below the plane of the rails 52. A sprocket wheel 62 which engages the upper run of link chain 58 is mounted on a shaft rigid with the cylinder 55 and rotatable relative to the shaft through a one way clutch (not shown). A second sprocket wheel 64, which also engages the upper run of the link chain 58 is mounted on a shaft rigid with the piston 56 of the arrangement 10 and rotatable relative to the shaft through another one way clutch. The two one way clutches are arranged so that they will only allow the wheels 62 and 64 to rotate in a clockwise sense (as viewed in FIG. 4). Thus upon each reciprocation of the piston and cylinder arrangement 10, the arrangement 10 will move relative to the chain 58 towards the right hand end as viewed in FIG. 4. The link chain 58 is coupled to be driven in synchronism with the belt 2 through an epicyclic gear system (not shown). The epicyclic gear system includes a motor (not shown) which when energised can effect relative displacement between the belt 2 and the chain 58.

In operation, the conveyor of FIG. 4 is driven in the reverse sense to that of FIGS. 1 and 2. Thus spaced stacks of bacon slices placed on the right hand end of the conveyor (as viewed in FIG. 4) will travel from right to left as indicated by arrow 3, and the upstream portion of the conveyor travels faster than the downstream portion.

It will be assumed that a first stack of bacon slices has just been transferred from the belts 4 and 4A to the belts 2 and 2A, that the piston and cylinder arrangement 10 have just performed a forward stroke (that is, the piston has extended), and that a second stack of bacon slices on the belts 4 and 4A is approaching the junction 6. At this time, the carriage 8 as a whole is being driven by, and moving with, the chain 58 at the same speed as the belts 2 and 2A. Since the belts 4 and 4A are moving faster than the belts 2 and 2A and the carriage 8, the second stack will eventually reach the junction 6. This will be detected by the photo cell 50 which will trigger the piston and cylinder arrangement to perform a return stroke (that is, to retract the piston). Because of the one way clutch associated with the sprocket wheel 64, the wheel 64 will be locked against rotation but the one way clutch associated with the sprocket wheel 62 will allow the wheel 62 to rotate. Thus the cylinder 54 together with the carriage 8 are rapidly displaced in an upstream direction. This causes the junction 6 between the fast and slow moving belts to pass rapidly under the second bacon stack thereby transferring the second stack from the fast upstream side to the slower downstream side of the conveyor. Thereafter the piston and cylinder arrangement automatically performs the next forward stroke. The one way clutch associated with the sprocket wheel 62 prevents the carriage moving relative to the chain so that during the forward stroke the carriage will remain moving in synchronism with the belt 2 but the piston will extend.

The cycle is then repeated.

The stroke of the cylinder and piston arrangement is preset to a value equal to the average dimension of a stack of bacon slices in the direction of movement of the upper run of the conveyor, plus the desired spacing between stacks.

It will be appreciated that the stacks of bacon slices transferred to the downstream portion of the conveyor will thus be spaced from one another by the desired constant interval.

The conveyor advantageously delivers the stacks of bacon slices to a packaging machine and in order to maintain synchronism between the operation of the packaging machine and the time of delivery of the stacks of bacon slices sensing means are provided to generate an error signal indicative of the magnitude of any timing error. This error signal is fed to a control circuit (not shown) which energises the drive motor of the epicyclic gear (not shown) and so adjusts the position of the chain 58 and therefore that of the carriage relative to the belt 2 (so as to adjust the time of arrival of subsequent stacks at the packaging machine), in a sense to reduce this timing error to zero.

It will also be appreciated the mean operating position of the carriage will move up and down the conveyor in dependence upon the spacing between the stacks of bacon slices delivered to the upstream portion of the conveyor. Accordingly photoelectric sensing means (not shown) are provided adjacent opposite ends of the conveyor to respond to the approach of the carriage by giving an alarm signal indicating that too few or too many stacks of bacon slices are reaching the upstream end of the conveyor.

The conveyor systems of FIGS. 1 to 3 and FIG. 4 can both be included in a bacon handling flow line, the system of FIGS. 2 to 3 being used to provide a minimum spacing between groups and the system of FIG. 4 providing uniform spacing of the groups.

The drive belts are preferably circular in cross-section and made of polyurethane.

It will be appreciated that the systems described can be used to handle foods other than bacon and articles other than foods.

Where particularly wide articles are to be handled, additional belts can be provided to operate in parallel with those already described.

I claim:

1. A conveyor handling system for transporting articles from a first position to a second position, comprising first and second endless conveyors each defining an upper run roller means supporting the two conveyors so that their upper runs extend in series between the two positions, the roller means having first and second coaxially supported rollers guiding adjacent ends of the upper runs to define a line junction between them, drive means coupled to drive the two conveyors at two respectively different speeds, means responsive to the approach of an article to the junction between the two conveyors at which the article is transferred from one conveyor to the other to provide an actuation signal, and actuation means responsive to the actuation signal and connected to the first and second rollers to displace said junction without altering the speeds of the two conveyors and in a sense to accelerate the transfer of the articles between the two conveyors.

2. A system according to claim 1, in which the actuator means comprises a carriage supporting the two rollers and movable to lengthen the upper run of one conveyor and simultaneously shorten the upper run of the other conveyor by a corresponding amount.

3. A conveyor handling system for transporting articles from a first position to a second position, comprising two endless belts extending between the first and second positions, first drive means coupled to the belts to drive them at different speeds in the same sense, a carriage movable between the first and second positions and having first and second coaxially arranged roller means constraining corresponding intermediate portions of the said two endless belts so that one belt forms the upper run of the conveyor system extending from a datum position on the carriage and away to one side of the datum position and the other belt forms the upper run of the conveyor system from the datum position and away to the other side of the datum position, second drive means for moving the carriage so as to vary the lengths of the belts which define the upper run, sensing means coupled to the carriage for sensing when an article on the upper run of the conveyor reaches the datum point, and control means, operative in response to the sensing means actuating the drive means, to displace the carriage in a sense to accelerate the transfer of the article from one belt to the other.

4. A system according to claim 3, wherein the sensing means comprises a photocell.

5. A system according to claim 3, wherein the articles are arranged to be transferred from the slow to the fast belt, and the second drive means are arranged to reciprocate the carriage, for forward stroke effecting the transfer of the article from the slow to the fast belt and the return stroke taking place at a speed at least equal to that of the slow belt and not exceeding that of the fast belt thereby to effect a minimum spacing between successive articles.

6. A conveyor handling system for transporting articles having a predetermined minimum random spacing from a first position to a second position, comprising two endless belts extending between the first and second positions, a carriage movable between the first and second positions and constraining intermediate portions of said endless belts so that one belt forms the upper run of the conveyor system to one side of a datum position on the carriage and the other belt forms the upper run of the conveyor system on the other side of the datum position, first drive means coupled to the belts to drive them in the same sense but with the upper run of the belt upstream of the datum position being driven faster than the upper run of the belt downstream of the datum position, second drive means operative to drive the carriage in synchronism with the slow belt, whereby to move the carriage so as to vary the lengths of the belts which define the upper run, sensing means coupled to the carriage for sensing when an article on the upper run of the conveyor reaches the datum point, and control means operative in response to the sensing means sensing an article, to cause the drive means to displace the carriage in the opposite sense to and at a faster speed than that of the upper run of the slow belt and thus effect an accelerated transfer of the article from the fast to the slow belt, thereafter allowing the carriage to continue in synchronism with the slow belt thus to effect a uniform spacing between the articles.

7. A conveyor handling system for transporting articles from a first position to a second position, comprising two endless belts extending between the first and second positions, a carriage movable between the first and second positions and constraining intermediate portions of said endless belts so that one belt forms the upper run of the conveyor system to one side of a datum position on the carriage and the other belt forms the upper run of the conveyor system on the other side of the datum position, first drive means coupled to the belts to drive them in the same sense but with the upper run of the belt upstream of the datum position being driven faster than the upper run of the belt downstream of the datum position, sensing means coupled to the carriage for sensing when an article on the upper run of the conveyor reaches the datum point, an endless chain belt coupled to be driven in synchronism with the slow belt, a piston and cylinder assembly including a first sprocket wheel supported on the piston through a one way clutch and a second sprocket wheel supported on the cylinder through a one way clutch, the two sprocket wheels engaging the chain belt, and the two clutches being locked against rotation in the sense they tend to be driven by the chain belt so that the piston and cylinder assembly is driven by the chain belt, means coupling one of the piston and cylinder to the carriage, and control means for causing the piston and cylinder assembly to perform one complete reciprocation in the opposite sense to and at a faster speed than that of the slower of the two belts in response to the sensing means sensing the article whereby the piston and cylinder assembly is displaced by the distance of the stroke of the reciprocation relative to the chain belt and therefore displaces the carriage by the same amount to cause an accelerated transfer of the article from one belt to the other.

8. Conveyor handling apparatus for spacing successively received batches of regularly spaced articles, the apparatus comprising upstream and downstream endless conveyor means, roller means mounting the said conveyor means for independent circulation with upper runs thereof in longitudinal alignment and concurrent at a transfer zone to provide a conveying surface for said articles received on the upper run of the upstream conveyor means, first drive means for continuously circulating the conveyor means so that the said upper runs thereof are driven in the downstream direction with the upper run of the downstream conveyor means moving at a substantially greater speed than the upper run of the upstream conveyor means, carriage means mounting part of the roller means whereby the transfer zone is reciprocable longitudinally of the conveyor means, and second drive means for reciprocating the carriage means between predetermined upstream and downstream positions thereof, a movement of the carriage means by the second drive means from the downstream to the upstream position thereof being effective to transfer articles on the upper run of the upstream conveyor means to the upper run of the downstream conveyor means, and a movement of the carriage means from the upstream to the downstream position thereof being effected by the second drive means at a speed which is intermediate the speeds of movement of the upper runs of the said conveyor means, wherein the improvement comprises the provision of sensing means mounted on the carriage and operable when the carriage is located at its said downstream position for sensing the first said article of a batch arriving at the said transfer zone on the upper run of the upstream conveyor means and for responsibly providing an output signal, the second drive means being responsive to such a said output signal from the sensing means to move the carriage means to its upstream position at a high speed, and the spacing of the said upstream and downstream positions of the carriage means being equal to the average length of a said batch of articles longitudinally of the conveyor means.

* * * * *